United States Patent Office 3,294,557
Patented Dec. 27, 1966

3,294,557
ELECTRICALLY RESISTANT GLASS COMPOSITIONS
Stephane Dufaure de Lajarte, Paris, France, assignor to Compagnie de Saint-Gobain, Neuilly-sur-Seine, France
No Drawing. Original application July 5, 1957, Ser. No. 669,956. Divided and this application Mar. 8, 1966, Ser. No. 532,592
Claims priority, application France, July 10, 1956, 1,162,152
5 Claims. (Cl. 106—52)

This is a division of application Serial No. 669,956, filed July 5, 1957, now U.S. Patent 3,252,812.

This invention relates to glass compositions, particularly to glass compositions which may be used in electrical instruments and in articles used in electrical work, which may be subjected to high voltage and which must have good resistance to electrical perforation when the article is heated to elevated temperature. Notable uses for such glass are in insulators and transformer bars.

In manufacturing such glasses it is difficult to achieve a combination of good properties; for instance, the glass, when hot, may readily be punctured by high-voltage current; or if it withstands such current, it may have too high an upper limit of devitrification; or it may have a temperature and speed of crystallization such as to permit the formation of devitrified particles during its transformation into useful articles by normal processes, and such devitrified particles must be entirely avoided, in particular for the manufacture of tempered articles; or its resistance to weather and water may be so low that its surficial resistance becomes lower after use outdoors, for instance as an insulator.

An object of this invention is to make glass which has high resistance to perforation by high-voltage electric current, particularly when the glass is hot.

Another object is to provide such glass with an upper limit of devitrification, a temperature and speed of crystallization, sufficiently low so that, glass objects free of devitrified particles can be produced therefrom by working under customary conditions.

Another object is to provide such glasses having good workable viscosity in the temperature ranges customarily used in the industry for fabricating objects of electrical utility.

Another object is to provide such glasses with good resistance to attack by water, weather, and current, so that parts exposed outdoors, such as insulators, may retain their high resistance at all times and over long periods.

These objects are accomplished, generally speaking, by a glass having the composition by weight

| | Percent |
|---|---|
| $SiO_2 + Al_2O_3$, $Al_2O_3$ not being over 8% | 68–75 |
| $Na_2O + K_2O$, $Na_2O$ not being over 13% when $Al_2O_3$ is over 4% and not over 11% when $Al_2O_3$ is less than 4% | 12–15 |
| $CaO + BaO + MgO$, CaO being between 7 and 12% and BaO absent if desired | 12–16 |
| Other metal oxides of glass-making grade, of which $B_2O_3$, $Fe_2O_3$, $ZrO_2$, $TiO_2$, PbO, MnO and ZnO are examples, and fluorine compounds | 0–5 |

These glasses are made in standard furnaces by standard melting, fining, conditioning and working techniques, the particular degrees of which are not part of this invention. When glass objects of the new compositions are made by hand or by automatic techniques, they have better resistance to perforation by electric current when hot than do the glass compositions of the prior art when made by like techniques.

The novel glasses have an upper limit of devitrification, a temperature and a speed of crystallization low enough so that, under the usual working conditions not the slightest devitrification is produced, the presence of devitrified particles being entirely excluded, particularly in the manufacture of tempered objects.

The viscosity of the novel glasses at fusion temperature is low enough to permit easy preparation under conditions that assure excellent homogeneity. Furthermore, their resistance to attack by water is so high that it prevents any substantial reduction, by weathering, of the surface resistance of insulators made from the glass.

The examples which follow, compare a prior art glass of a standard composition for electrical insulators, denominated "A," with glasses "B," "C," "D" which conform to this invention, as to their devitrification and resistance to perforation by voltage at high temperature. The latter quality was measured on plates A, B, C, D of 500 x 500 x 7 mm., which had been polished and tempered and kept at uniform temperature of 200° C. in an electric furnace. The voltage was applied at the center of these plates by two circular metal electrodes of 40 mm. diameter soldered to the glass by metal solder to prevent the intrusion of air, one of the electrodes being encircled by a ring for distributing the potential fixed to the glass in the same way. The current, perfectly sinusoidal, having a frequency of 50 periods per second, was increased every 10 seconds by increments of 5 kv., from 0 until perforation occurred.

| | A | B | C | D |
|---|---|---|---|---|
| $SiO_2$ | 69.0 | 69.6 | 66.8 | 68.1 |
| $B_2O_3$ | | | | 1 |
| $Al_2O_3$ | 1.5 | 3.5 | 3.0 | 2.5 |
| $Fe_2O_3$ | 1.3 | 0.8 | 1.6 | 0.8 |
| MnO | 0.6 | 0.3 | 0.6 | 0.3 |
| CaO | 11.3 | 11 | 9 | 10 |
| MgO | 1.5 | 2 | 4 | 2 |
| BaO | | | 3 | 3 |
| $Na_2O$ | 14.5 | 10.6 | 8 | 9 |
| $K_2O$ | 0.3 | 2.2 | 4 | 3.3 |
| Devitrification: | | | | |
| Upper limit, ° C | 1,070 | 1,135 | 1,146 | 1,120 |
| Temperature of maximum rate of crystallization, ° C | 976 | 1,016 | 1,047 | 1,000 |
| Speed of, at maximum rate, in microns/minute | 5.1 | 7.5 | 11.6 | 3 |
| Resistance to perforation at 200° C., kv | 14 | 24.5 | 36 | 31 |

The foregoing glasses were made under the temperature conditions shown in the table, were poured on a table, cooled, ground, polished, and tempered, all by standard techniques.

The glasses of this invention have higher resistance to perforation by electric current, compared to standard insulators of the prior art, of which glass A is typical. No substantial changes in conditions of manufacture are required by the characteristics of devitrification of the new glasses, which is advantageous in itself. Composition B has superior resistance to the atmosphere, including the chemical agents found in it in proximity to factories, and to the attacks of the atmosphere in changing conditions of heat and cold, wet and dry.

As many apparently widely different embodiments of the present invention may be made without departing from the spirit and scope thereof, it is to be understood that the invention is not limited to the specific embodiments.

What is claimed is:

1. Electrically resistant glass, particularly useful for electrical insulators, having a composition consisting essentially of $SiO_2$ 69.6% by weight; $Al_2O_3$ 3.5%; $Fe_2O_3$ 0.8%; MnO 0.3%; CaO 11%; MgO 2%; $Na_2O$ 10.6%; $K_2O$ 2.2% having an upper limit of devitrification circa 1135° C., a maximum rate of crystallization at about 1016° C., a maximum rate of devitrification circa 7.5 microns/minute, and a resistance to perforation at 200° C. of about 24.5 kv.

2. Electrically resistant glass, particularly useful for electrical insulators, having a composition consisting essentially of $SiO_2+Al_2O_3$ 68–75% by weight of which $Al_2O_3$ is always present in a quanity less than 8%;
$Na_2O+K_2O$, both being present in a total weight of 12–15% and $K_2O$ being at least 1%, $Na_2O$ being not over 11% when $Al_2O_3$ is less than 4% and not over 13% when $Al_2O_3$ is over 4%; $CaO+MgO$ about 13%, CaO being 7–12%; metal oxides of the type of $B_2O_3$, $Fe_2O_3$, $ZrO_2$, $TiO_2$, PbO, MnO, ZnO+fluorine compounds 0–5%.

3. Glass according to claim 2 in which $K_2O$ is from 1–4%.

4. Electrically resistant glass, in particular for glass insulators, having a resistance to perforation equivalent to at least about 20 kv. in a plate 500 x 500 x 7 mm. at 200° C., under sine wave current of 50 periods, and having a composition consisting essentially of

| | Wt. percent |
|---|---|
| $SiO_2+Al_2O_3$, of which $Al_2O_3$ is always present and is lower than 8% | 68–75 |
| $Na_2O+K_2O$, of which $K_2O$ is greater than 1% and $Na_2O$ is not over 11% when $Al_2O_3$ is less than 4% and $Na_2O$ is not over 13% when $Al_2O_3$ is greater than 4% | 12–15 |
| CaO and MgO both present with CaO in the range 7–12% | 12–16 |
| Metal oxides of the type of $B_2O_3$, $Fe_2O_3$, $ZrO_2$, $TiO_2$, PbO, MnO, ZnO+fluorine compounds | 0–5 |

5. Glass according to claim 4 in which $K_2O$ is from 1–4%.

References Cited by the Examiner
UNITED STATES PATENTS

| 2,443,142 | 6/1948 | Lyle | 106—48 |
| 2,756,158 | 7/1956 | Hahn et al. | 106—50 |

HELEN M. McCARTHY, *Acting Primary Examiner.*